United States Patent
Cerda Varela et al.

(10) Patent No.: US 11,655,800 B2
(45) Date of Patent: May 23, 2023

(54) MAIN BEARING FOR A WIND TURBINE

(71) Applicant: Siemens Gamesa Renewable Energy A/S, Brande (DK)

(72) Inventors: Alejandro Cerda Varela, Copenhagen East (DK); Niels Karl Frydendal, Herning (DK); Kim Thomsen, Skørping (DK); Morten Thorhauge, Ry (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 25 days.

(21) Appl. No.: 17/240,126

(22) Filed: Apr. 26, 2021

(65) Prior Publication Data
US 2021/0332801 A1  Oct. 28, 2021

(30) Foreign Application Priority Data

Apr. 28, 2020 (EP) .................................. 20171735

(51) Int. Cl.
*F16C 17/10* (2006.01)
*F16C 19/52* (2006.01)
(Continued)

(52) U.S. Cl.
CPC ............. *F03D 80/70* (2016.05); *F03D 17/00* (2016.05); *F16C 17/10* (2013.01); *F16C 19/522* (2013.01);
(Continued)

(58) Field of Classification Search
CPC ........ F16C 17/03; F16C 17/035; F16C 17/04; F16C 17/06; F16C 17/065; F16C 17/10;
(Continued)

(56) References Cited

U.S. PATENT DOCUMENTS 4,322,116 A * 3/1982 Heinemann ......... F16C 32/0666
384/100
6,623,164 B1 * 9/2003 Gozdawa ............ F16C 32/0666
384/119
(Continued)

FOREIGN PATENT DOCUMENTS

DE 102014200712 A1 * 7/2015 .............. F16C 17/06
EP 2796740 A1 10/2014
(Continued)

OTHER PUBLICATIONS

Ring—merriam-webster.com.*
European Search Report dated Oct. 21, 2020 for application No. 20171735.2.

*Primary Examiner* — Phillip A Johnson
(74) *Attorney, Agent, or Firm* — Schmeiser, Olsen & Watts LLP

(57) ABSTRACT

Provided is a main bearing for a wind turbine, including a stationary ring and a rotating ring to be coupled to a rotor, whereby the main bearing is a fluid film bearing including several bearing units arranged at the stationary ring around the circumference on both sides of the rotating ring, for radially and axially bearing the rotating ring, and further including a load measurement arrangement for determining measurement data which are a measure for the load applied to or resting on at least one of the axial or radial bearing units.

13 Claims, 5 Drawing Sheets

(51) Int. Cl.
*F03D 80/70* (2016.01)
*F03D 17/00* (2016.01)
*F16C 41/00* (2006.01)

(52) U.S. Cl.
CPC .......... *F16C 41/00* (2013.01); *F05B 2240/54* (2013.01); *F05B 2270/301* (2013.01); *F05B 2270/331* (2013.01); *F05B 2270/808* (2013.01); *F16C 2233/00* (2013.01); *F16C 2360/31* (2013.01)

(58) Field of Classification Search
CPC .... F16C 19/522; F16C 41/00; F16C 2233/00; F16C 2360/31; F03D 80/70
USPC ........................................................ 384/122
See application file for complete search history.

(56) References Cited

U.S. PATENT DOCUMENTS

| | | | | |
|---|---|---|---|---|
| 6,739,756 | B2 * | 5/2004 | Miller | F16C 33/1075 |
| | | | | 384/309 |
| 2011/0188988 | A1 * | 8/2011 | Wadehn | F03D 1/0658 |
| | | | | 415/4.5 |
| 2012/0068460 | A1 | 3/2012 | Wadehn | |
| 2012/0099993 | A1 * | 4/2012 | Guerenbourg | F16C 17/03 |
| | | | | 384/114 |
| 2014/0169952 | A1 * | 6/2014 | Pedersen | F16C 17/06 |
| | | | | 415/170.1 |
| 2019/0017496 | A1 * | 1/2019 | Wilson | F16C 17/06 |

FOREIGN PATENT DOCUMENTS

| | | | | | |
|---|---|---|---|---|---|
| GB | 2235258 | A | * | 2/1991 | ............. F16C 17/04 |
| KR | 20120080294 | A | * | 7/2012 | ............. F16C 17/10 |

\* cited by examiner

MAIN BEARING FOR A WIND TURBINE

CROSS-REFERENCE TO RELATED APPLICATIONS

This application claims priority to European Application No. 20171735.2, having a filing date of Apr. 28, 2020, the entire contents of which are hereby incorporated by reference.

FIELD OF TECHNOLOGY

The following relates to a main bearing for a wind turbine, comprising a stationary ring and a rotating ring to be coupled to a rotor.

BACKGROUND

A wind turbine comprises, as commonly known, a rotor comprising a hub with one or more rotor blades, usually three rotor blades, attached to it, which hub is connected to a main bearing arranged at a nacelle, which main bearing comprises a stationary ring and a rotating ring coupled to the rotor. The hub is further coupled to a generator. The wind interacts with the rotor blades so that the rotor rotates and drives the generator. As mentioned, the main bearing, which can e.g., be a single bearing or a double bearing, respectively in relation to a two-bearing system, is responsible for providing the rotational arrangement of the rotor relative to the stationary parts, for instance the main beam or shaft and related bedplate support arranged in the nacelle. Therefore, the load of the rotor is taken by the main bearing and finally transferred via the main bearing to the stationary parts of the arrangement.

In view of the loads to be taken a main bearing is usually a roller bearing, for example a double row tapered roller bearing, which is used for example in direct drive wind turbines but can also be used in turbines having a gear connection of the rotor to the generator. In the rotor bearing roller elements roll on the respective running surfaces of the inner and outer ring. The dimensions respectively the setup of this roller bearing is chosen to meet the especially mechanical needs for taking the rotor loads, which may also vary during operation due to the operation condition. As the layout of the roller bearing is very robust in this circumstance, the bearing is very heavy and expensive and the scalability is poor.

SUMMARY

An aspect relates to an improved main bearing for a wind turbine.

For solving the problem, the embodiments of the invention propose a main bearing for a wind turbine, comprising a stationary ring and a rotating ring to be coupled to a rotor. The main bearing is a fluid film bearing comprising several bearing units. These bearing units may in particular be radial bearing units, axial bearing units and/or tapered bearing units. The bearing units are arranged at the stationary ring around the circumference on both sides of the rotating ring, for radially and axially bearing the rotating ring. The main bearing further comprises a load measurement arrangement for determining measurement data which are a measure for the load applied to or resting on at least one of the bearing units.

The main bearing is a fluid film bearing, which does not comprise any roller elements like the roller bearing. Instead, a thin fluid film is used as a hydrodynamic or hydrostatic sliding means; or hydrodynamic or hydrostatic sliding film. The fluid film is present between the respective sliding surfaces of the rotating ring and respective sliding surfaces of bearing units arranged at the stationary ring. These bearing units may comprise radial bearing units for radially guiding the rotating ring, and axial bearing units arranged on both sides of the stationary ring and facing the axial sliding surfaces of the rotating ring. Furthermore, these bearing units may also comprise tapered bearing units. Generally, a tapered bearing is a bearing that can support axial forces as well as radial forces. In a tapered bearing, the inner and outer ring raceways are usually segments of cones. The respective tapered bearing units may additionally also be formed conically. Around the circumference of the rotating ring a number of the bearing units are provided. This type of main bearing is advantageous over roller bearings, as they are often less heavy and less costly, while showing enhanced bearing properties and an improved scalability.

The main bearing further comprises a load measurement arrangement, which is adapted to determine measurement data which are a measure for the load applied to or resting on at least one of the axial or radial bearing units. So, the inventive main bearing is characterised by an integrated load measurement arrangement, which allows for constantly measuring the loads exerted over the main bearing or the main bearings of the wind turbine rotor during standstill and during its operation. A control device which is connected to or which is a part of the load management arrangement constantly receives the measurement data and processes them, which data respectively load information is relevant for various purposes. Firstly, such loads are directly related to the aerodynamic loads over the turbine blades. The load measurement can therefore be used as an additional input for the wind turbine controller, which controller determines the pitch and yaw angle actuation and can control the blade actuation accordingly. It may furthermore control the power output or other parameters effecting the turbine load. Secondly, the measurement data can provide information related to load shearing between the bearing units, which may comprise sliding pads, which may tilt. The load information may be used for constantly monitoring the condition of the bearing units respectively the sliding pads as well as the bearing clearance between the bearing units and the rotating ring. So, it allows a wear respectively maintenance control.

As mentioned above, the load measurement arrangement may be adapted to measure load data applied to or resting on at least one of the radial or axial bearing units. So, load information related to e.g., only one axial or only one radial bearing unit may already provide a good information basis to be processed by the controller. But the more measurement data at hand, the better is the overall information about the load distribution etc. Therefore, the measurement arrangement is adapted to determine measurement data for at least one axial bearing unit and at least one radial bearing unit, and for all axial, radial and/or tapered bearing units. In an embodiment, measurement data of at least one axial and at least one radial bearing unit are provided, so that axial and radial load data are at hand and may be processed. But as around the circumference a number of axial and radial bearing units are provided, in the most sophisticated embodiment of the invention measurement data of all axial and/or radial bearing units are taken and provided, all axial and radial bearing units, so that an overall load distribution is constantly monitored and can be processes respectively taken into account when controlling any load relevant devices of the turbine.

The measurement arrangement may be a direct measurement arrangement for measuring the data directly at the at least one bearing unit respectively at the several or all bearing units. In this embodiment the measurement arrangement respectively the sensor or sensors, which are part of the arrangement and which measure the load, measure the information data directly at the loaded unit. In an alternative the measurement arrangement may be adapted for an indirect measurement of the data remote of the at least one bearing unit. In this embodiment the or each sensor is not directly arranged at the loaded bearing unit, but remote to it, so that it measures data, which are indirect measurement data respectively values, but which are also a very precise measure of the real load resting on the bearing unit.

If the measurement arrangement is a direct measurement arrangement, it may comprise at least one measurement device being directly attached to the at least one bearing unit. In this direct measurement embodiment at least one measurement device, i.e., a respective sensor or sensor device is directly attached to the loaded bearing unit, the load of which shall be measured. If only one bearing unit is under surveillance, only this single bearing unit is provided with the measurement device respectively the sensor. If more than one bearing unit is under surveillance, each bearing unit is provided with the separate measurement device respectively sensor.

In a further embodiment of this alternative the measurement device is or comprises at least one strain gauge or one load cell arranged at the support structure of the at least one bearing unit. This measurement device respectively sensor or sensor device is either a separate strain gauge or a load cell, which may comprise for example several strain gauges or an array of strain gauges or the like. The measurement device, however, it is set up, is arranged or attached to a support structure of the at least one or each bearing unit to be measured. A bearing unit usually comprises a slide pad, which is attached to a support structure, by which support structure it is fixed to the stationary part respectively the stationary ring of the main bearing. The connection of the slide pad to the support structure may be a ball joint, so that the pad may slightly tilt relative to the support structure and thus relative to the stationary ring in order to follow any little movement or tilting of the rotatable ring, on which the rotor load rests. The load resting on the slide pad is directly transferred to the support structure, where the respective load can be measured with the measurement device.

If a ball joint is used, which is only mentioned as an example for a coupling of the bearing pad to the support structure allowing a certain movement, the ball joint comprises a ball head provided at the bearing pad and a ball socket provided at the support structure, whereby the strain gauge or the load cell is mounted to the bottom side of the support structure adjacent to the ball socket. As the ball joint respectively the ball head engaging in the ball socket is the mechanical interface between the bearing or slide pad and the support structure, the load is transferred over this interface and can therefore be precisely measured in the area of this interface.

For arranging the measurement device respectively, the sensor like the strain gauge or the load cell the bottom side is provided with a recess, in which recess the measurement device is arranged.

As already mentioned, the measurement arrangement comprising the measurement device is adapted to measure load related data at at least one bearing unit. For processing the measurement data the measurement device communicates with a controller adapted to process the data, for example comprising a respective CPU with respective processing algorithms etc. In the embodiment with a direct measurement of the load data or the load related data the measurement device, as explained above, is arranged at the at least one bearing unit or, if several or all bearing units are under surveyance, at each separate bearing unit. Therefore, a certain number of separate measurement devices respectively sensors like strain gauges or load cells are integrated in the whole measurement arrangement. Each of these measurement devices communicates with the central controller of the measurement arrangement, which is adapted to process all incoming measurement data based on its respective processing software. The controller is further adapted to output any relevant control information which is necessary to either directly control a respective device, or which is communicated to another controller which is responsible for the device control.

As mentioned above, an alternative embodiment discloses a main bearing with an indirect measurement arrangement. If such an indirect measurement arrangement is provided, this measurement arrangement comprises at least one measurement device attached to the rotating ring. In this embodiment the measurement device is not arranged at the bearing unit(s) or at the stationary ring, but at the rotating ring and therefore rotates with the rotating ring. The measurement device therefore moves along the respective number of axial or radial bearing units, which ever load is to be measured. During the movement it passes along each of the bearing unit either arranged axially or radially, so that the single measurement device can measure the load resting on each axial or radial bearing unit it passes. This allows for a precise monitoring of the load respectively the load distribution of all axial bearing units on one side or of all radial bearing units with only one measurement device.

As mentioned, the measurement device is adapted to indirectly measure the load resting on the respective bearing unit. The outer ring is coupled to the inner ring respectively the axial and radial bearing units arranged at the inner ring via a lubrication fluid which provides a thin hydrodynamic fluid film in the gap between the outer ring and each of the radial and axial bearing units respectively their bearing or sliding pads. As previously mentioned, each bearing unit comprises a sliding pad arranged at a support structure via a ball connection with a ball head at the sliding pad and a ball socket at the support structure. Therefore, the measurement device needs to be adapted to measure the measurement data indirectly by measuring any relevant data of the fluid in the gap between the outer ring and the respective bearing unit respectively its sliding pad. To allow such a measurement the measurement device is or comprises at least one pressure sensor arranged and adapted for measuring the fluid pressure of a lubrication fluid present in the gap between the rotating ring and the radial or axial bearing units. Here the measurement data are pressure data being a value for the high pressure of the lubrication fluid in the gap between the outer ring and the respective bearing unit. The pressure of the lubrication fluid in the gap depends on the overall load resting on the respective bearing unit. Therefore, the measurement of the fluid pressure is a precise measurement value for the pressure resting on the respective bearing unit.

For arranging the pressure sensor at the rotating ring either a radial or axial bore, depending if the load on a radial bearing unit or on an axial bearing unit is to be measured, is provided in the rotating ring, which bore is open towards the adjacent radial or axial bearing units, in which bore the at least one pressure sensor is arranged. The arrangement of the pressure sensor in the respective bore is simple, as it is only necessary to drill the radial or axial bore in the sliding surface of the rotating ring and to insert the pressure sensor. As the bore is open towards the adjacent radial or axial bearing units, the pressure sensor is directly impinged with the lubrication fluid pressure and can therefore very precisely measure the fluid pressure, which is directly related to the load.

If as well the load of the axial bearing units as the load of the radial bearing units is to be measured, the rotating ring is provided with at least two bores, one open to the radial bearing units and the other one open to the axial bearing units arranged at one ringside, with a separate pressure sensor arranged in each bore. If only one axial bore is provided, the axial bearing units at only one bearing side are load measured. If the bearing units on both axial bearing sides shall be load measured, a third bore, which is open to the opposite ring side with the third pressure sensor inside is provided. This three-sensor arrangement provides an overall load monitoring of each single bearing unit, be it a radial bearing unit or an axial bearing unit, with only three sensors. The pressure sensor respectively all pressure sensors are also in this embodiment coupled to a controller, which is, as already mentioned above, adapted to process the delivered measurement data respectively measurement values and to provide any relevant control information for the further control of any relevant turbine device. Also, in this embodiment the controller comprises a respective CPU with a processing software.

Furthermore, embodiments of the invention relate to a wind turbine, comprising at least one main bearing as mentioned above. The wind turbine, as commonly known, comprises a rotor with a hub and the rotor blades attached to the hub, which hub is coupled to the rotor of the generator. The rotor is coupled to the rotating ring of the inventive main bearing as mentioned above.

Finally, embodiments of the invention relate to a method for condition monitoring a main bearing as described above and for controlling a wind turbine based on the determined measurement data.

BRIEF DESCRIPTION

Some of the embodiments will be described in detail, with references to the following Figures, wherein like designations denote like members, wherein.

DETAILED DESCRIPTION

Figure 1:
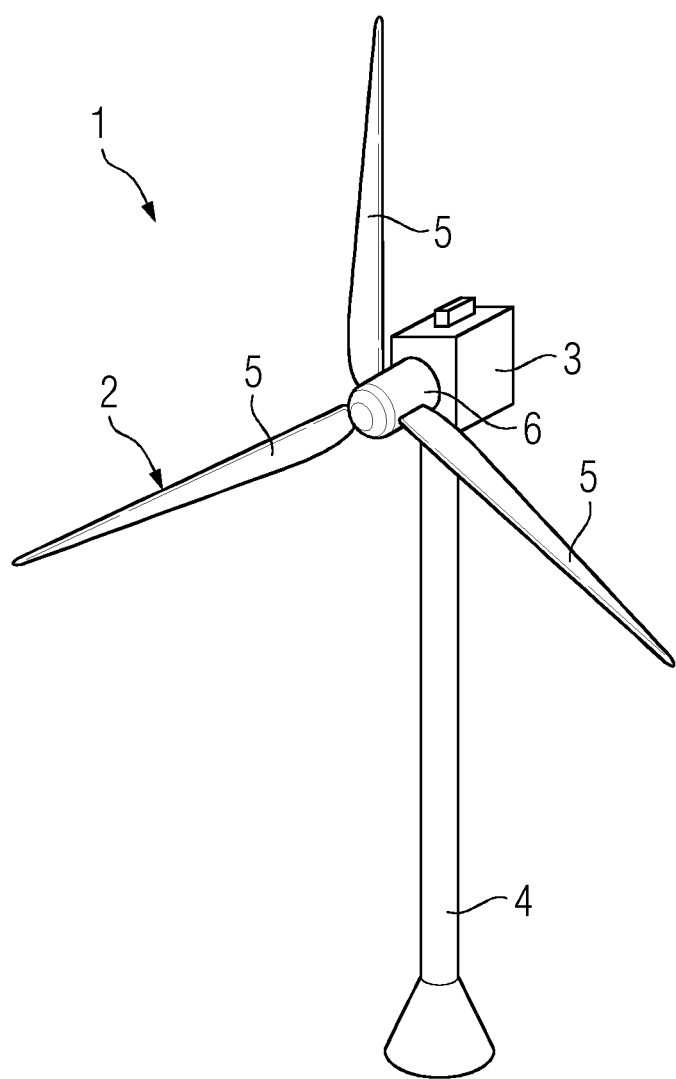
FIG. 1 shows a principle sketch of a wind turbine.

FIG. 1 shows an inventive wind turbine 1, comprising a rotor 2 rotatably arranged in a nacelle 3, which is arranged on the top of a tower 4. The rotor 2 comprises three rotor blades 5 attached to a hub 6 as is commonly known. The rotor blades 5 interact with the wind making the rotor rotate. The rotor drives an electric generator, such as a direct drive generator.

Figure 2:
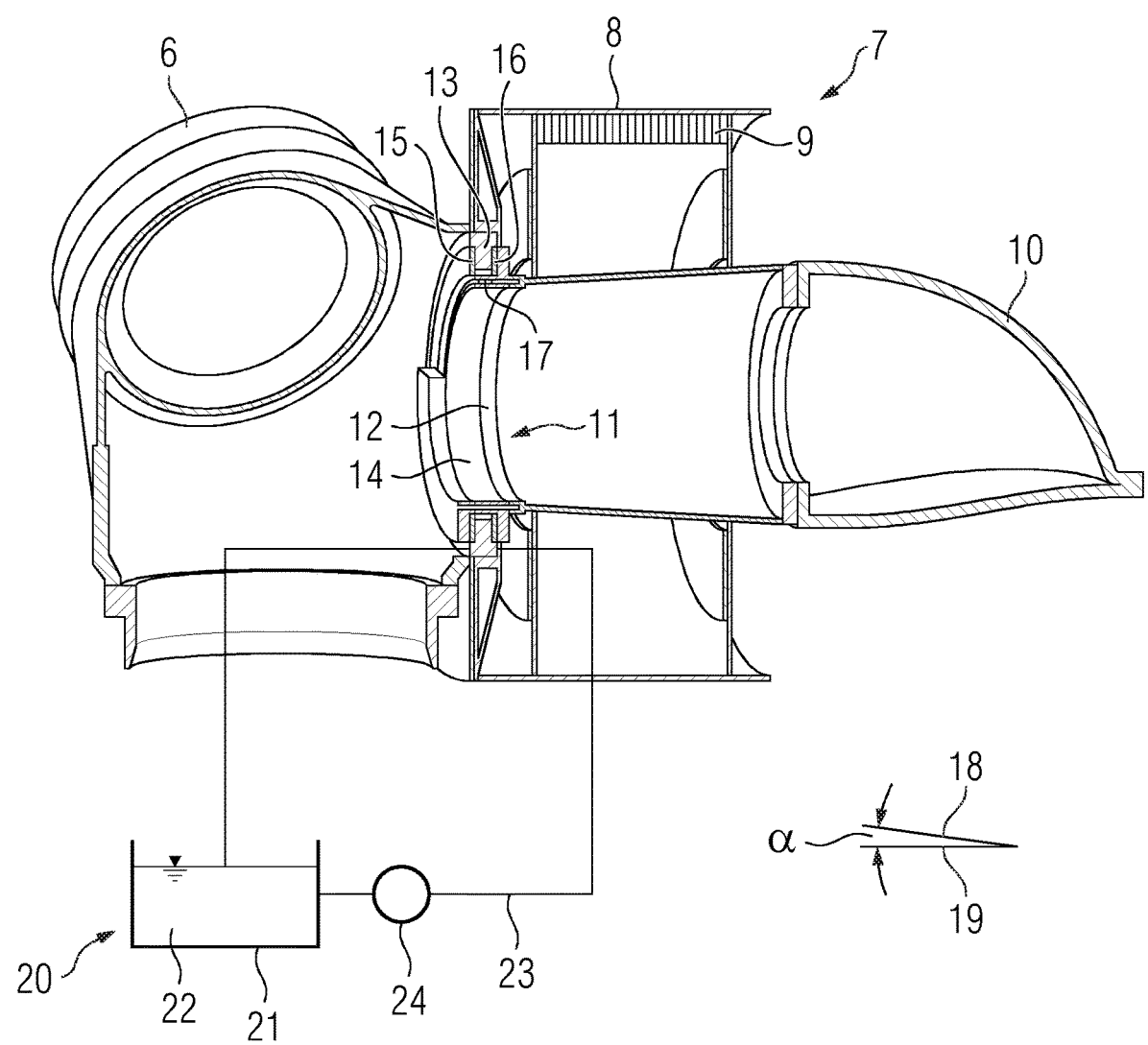
FIG. 2 shows the arrangement of a hub, a generator rotor and a main bearing.

FIG. 2 shows an arrangement with the central elements of the wind turbine 1. It shows the hub 6 which is connected to a direct drive generator 7 comprising a rotor 8, which here is directly coupled to the hub 6, and further a stator 9. The stator 9 is stationary fixed to a main shaft 10.

The arrangement of hub 6 and rotor 8 is rotatable relative to the stationary main shaft 10 respectively the stator 9. For bearing the hub-rotor-arrangement a main bearing 11 is provided, which in the shown embodiment is a slide bearing 12 comprising a rotating ring which here is an outer ring 13, to which the hub-rotor-arrangement with the hub 6 and the rotor 8 is connected, so that, when the hub 6 rotates, also the outer ring 13 and the rotor 8 rotate. The main bearing 11 further comprises a stationary ring, which here is an inner ring 14 which is fixed to the main shaft 10.

As the main bearing 11 is a slide bearing 12 the rotating outer ring 13 is slidingly guided by axial and radial guiding or sliding pads relative to the stationary inner ring 14. Alternatively, the rotating outer ring may be guided by tapered guiding or sliding pads in a tapered sliding bearing (not shown). FIG. 2 shows front axial bearing units 15 and rear axial bearing units 16 for axially guiding the outer ring 13 and radial bearing units 17 for radially guiding the outer ring 13. The bearing units 15, 16 and 17 are stationary fixed to the stationary inner ring 14.

The axis of rotation of the rotor 2 and therefore also the axis of rotation of the main bearing 11 is slightly tilted relative to the horizontal plane or axis. FIG. 2 shows the tilt angle α, which the axis of rotation 18 of the main bearing 11 shows relative to the horizontal plane or axis 19. Therefore, the main bearing 11 is slightly tilted.

As mentioned, the main bearing 11 is a slide bearing. This slide bearing needs to be lubricated by a lubrication fluid, which provides an extremely thin hydrodynamic fluid film between the sliding surfaces of the outer ring, which rotates, and the axial and radial bearing units 15, 16 and 17. It is therefore necessary to constantly provide enough lubrication fluid in this area, which can either be flooded or directly introduced respectively lubricated to respective bearing point or evacuated bearing cavities etc. The lubrication system needs to maintain a permanent and constant lubrication amount in this area.

For providing a constant lubrication, an automatic lubrication arrangement 20 is provided, which is shown in principle in FIG. 2. This lubrication arrangement comprises a reservoir 21 with the lubrication fluid 22, which is integrated in a lubrication circuit 23. The lubrication fluid 22 circulates in the circuit 23 with a pump 24 integrated in the circuit 23. The circuit 23 comprises one or more fluid pipes, which or at least some of which are guided to the main bearing 11 and emit the lubrication fluid 22 at one or several points to the main bearing 11 or to completely flood it.

Figure 3:
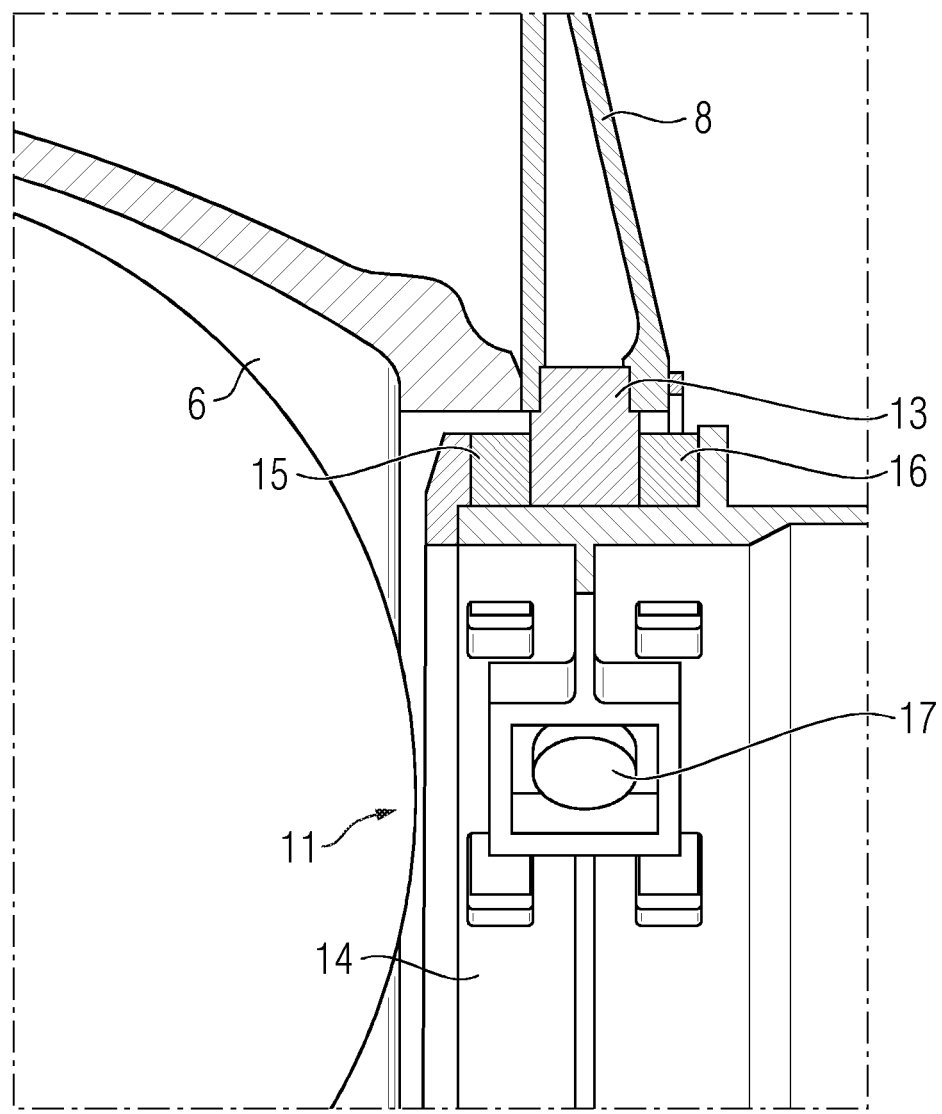
FIG. 3 shows an enlarged partial cross-sectional view of the main bearing.

FIG. 3 shows an enlarged view of the main bearing 11 respectively the slide bearing 12. Around the circumference of the inner ring 14 a number of axial bearing units 15 are arranged adjacent to the left or outer side of the outer rotating ring 13, while the axial bearing units 16 are arranged adjacent to the inner or right side of the rotating ring 13. Between the bearing units 15, 16 and the surfaces of the rotating ring 13 a certain gap is given, in which the fluid film is present. As also shown radial bearing units 17 are arranged at the inner ring 14, which guide the rotating ring 13 radially. Also, here a gap is given between the inner surface of the rotating ring 13 and the radial bearing units respectively their sliding or bearing pads, which fluid film guides the rotating ring 13.

The inventive main bearing 11 is equipped with a load measurement arrangement, which is adapted to determine measurement data which are a measure for the load applied to or resting on at least one of the axial or radial bearing units 15, 16, 17. This load measurement arrangement may either be a direct measurement arrangement for measuring the data directly at at least one or more bearing units. In a second embodiment the measurement arrangement may be an indirect measurement arrangement for measuring the data as indirect data remote to the at least one or the more bearing units.

If the measurement arrangement is a direct measurement arrangement, it is directly arranged at least with its measuring device at one or more axial bearing units 15, 16 or at least one or more radial bearing units 17. If the measurement arrangement is an indirect measurement arrangement, it is arranged at the rotating ring 13. The different setups of this measurement arrangements will be explained below in detail.

Figure 4:
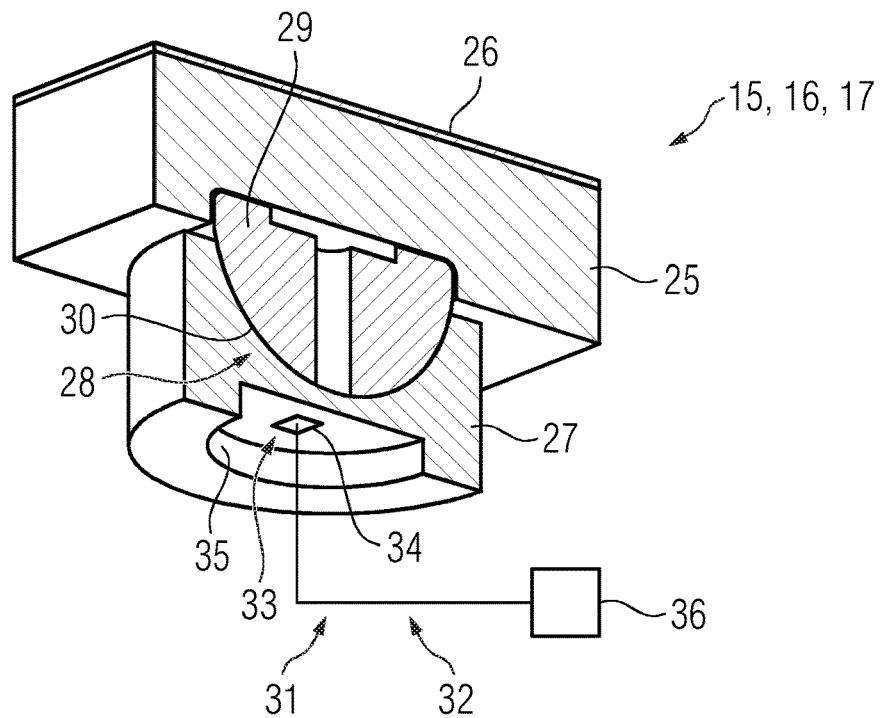
FIG. 4 shows a bearing unit of a first embodiment with a measurement device in form of a strain gauge.

FIG. 4 shows a bearing unit, which may either be an axial bearing unit 15, 16 or a radial bearing unit, as the setup of these different bearing units is comparably the same. Each bearing unit 15, 16, 17 comprises a bearing pad 25 having a sliding surface 26 facing towards the sliding surface of the rotating ring 13 and contacting the fluid film. The bearing unit 15, 16, 17 further comprises a support structure 27, to which the bearing pad 25 is fixed with a ball joint 18 comprising a ball head 29 arranged at the bearing pad 25 and a ball socket 30 arranged at the support structure 27, in which ball socket 30 the ball head 29 engages. This ball joint 28 allows a tilting movement of the bearing pad 25 relative to the stationary and immovable support structure 27, which is stationary relative to or fixed to the inner ring 14.

A measurement arrangement 31 is provided, which is a direct measurement arrangement 32. It is adapted to measure the load resting on the bearing unit 15, 16, 17 directly as a load measurement value. The direct measurement arrangement 32 comprises a measurement device 33 here in form of a strain gauge 34, which is arranged in a recess 35 provided at the bottom side of the support structure 27 close to the ball joint 28. The measurement device 33 is connected to a controller 36, which is part of the measurement arrangement 31, and which controller 36 is adapted to process the measurement data determined by the measurement device 33 and to output control data or the like for controlling other turbine devices.

As mentioned, a number of axial bearing units 15, 16 or radial bearing units 17 are distributed along the circumference of the inner ring 14. Only one axial and/or radial bearing unit may be equipped with the direct measurement arrangement 32 respectively the measurement device 33, or, several or all axial and radial bearing units 15, 16, 17 are each equipped with such a measurement device 33, with all measurement devices 33 being connected to a common controller 36, so that the controller 36 receives the measurement load data from all measurement devices 33 respectively strain gauges 34. This allows the controller 36 to completely monitor the whole load distribution of the rotor load resting on the main bearing 11 over all axial and radial bearing units 15, 16, 17 and to monitor the load distribution over the time, based on which monitoring respective control data may be processed and provided or respective wear and maintenance surveyance may be done etc.

Figure 5:
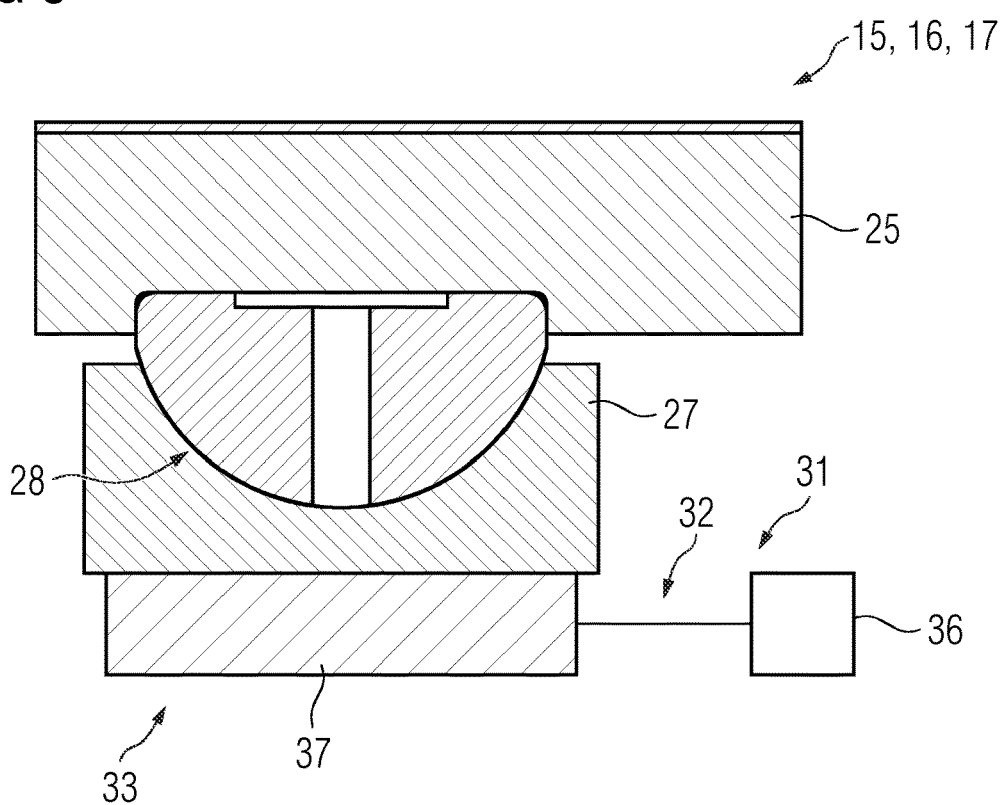
FIG. 5 shows a bearing unit of a second embodiment with a measurement device in form of a load cell.

FIG. 5 shows another embodiment of a measurement arrangement 31 in form of a direct measurement arrangement 32 for directly measuring the load resting on the axial or radial bearing unit 15, 16, 17. The setup of the bearing unit 15, 16, 17 is the same as explained to FIG. 4, reference is made to the description above. In the embodiment shown in FIG. 5 the measurement device 33 is a load cell 37 attached to the bottom surface of the support structure 27 supporting the bearing pad 25 via the ball joint 28. The load cell comprises one or more load sensors, like strain gauges arranged in an array or any other load or pressure sensors and outputs a respective measurement data again to the controller 36 who processes the data.

Also, in this embodiment each bearing unit 15, 16, 17, which shall be load measured, is equipped with a load cell 37, while all load cells 37 are again connected to a common controller 36, who also in this embodiment is adapted to monitor the load distribution over all bearing units 15, 16, 17 being integrated in the load measurement arrangement.

Figure 6:
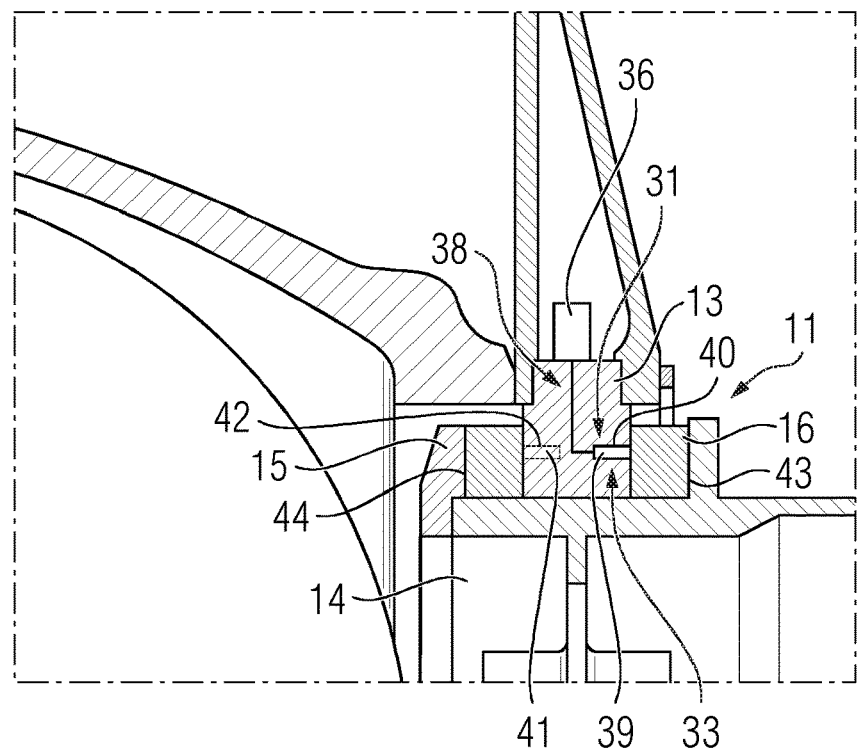
FIG. 6 shows a main bearing cross section with a measurement device in form of a pressure sensor arranged in the rotating ring.
Figure 7:
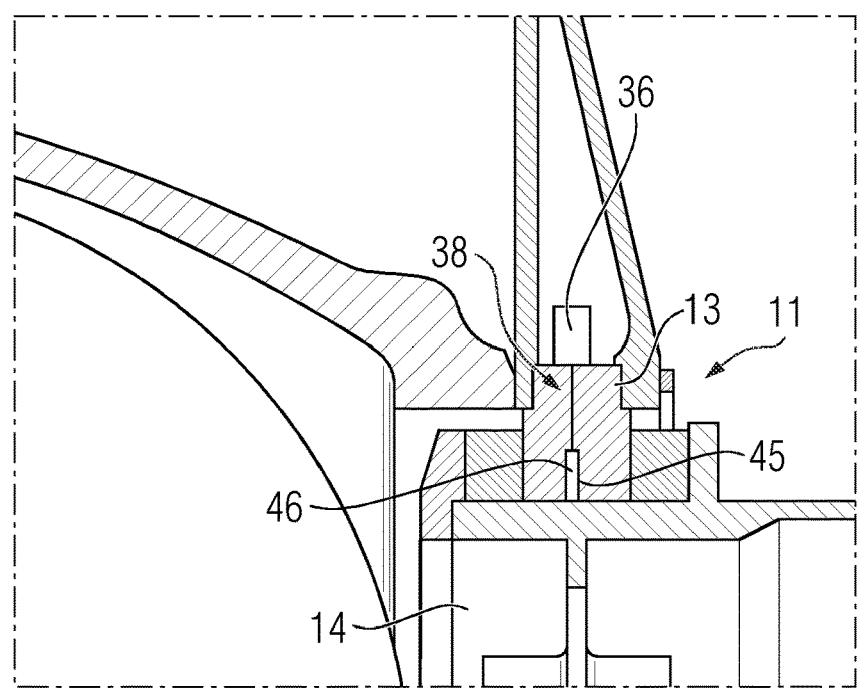
FIG. 7 shows the arrangement of FIG. 6 with another pressure sensor.

While the FIGS. 4 and 5 show direct load measurement arrangements 32, the main bearing can also be equipped with an indirect measurement arrangement. FIGS. 6 and 7 show two embodiments.

FIG. 6 shows a cross sectional view of the main bearing 11 with the inner ring 14, the outer ring 13 and two radial bearing units 15, 16. In this embodiment the rotating ring 13 is equipped with the measurement arrangement 31 here in form of an indirect measurement arrangement 38. This indirect load measurement arrangement 38 comprises a measurement device 33 in form of a pressure sensor 39, which is in this embodiment arranged in an axial bore 40, which is open to the bearing units 16 arranged adjacent to the right side of the rotating ring 13 and fixed to the inner ring 14. The pressure sensor 39 is connected to a controller 36 which is adapted to process the measurement data provided by the pressure sensor 39.

While FIG. 6 only shows a pressure sensor 39 facing towards the bearing unit 16, it is certainly also possible to provide a second pressure sensor 41, which is arranged in an axial bore 42 facing towards the bearing units 15 arranged on the other side of the rotating ring 13. The pressure sensor 41 and the bore 42 are shown only with dotted lines, as they may also be arranged at another circumference position like the first pressure sensor 39, while they may also be arranged in line with the first pressure sensor 39.

The pressure sensor 39 and, if given, the pressure sensor 41 are fluid pressure sensors or pressure transducers, which move with the rotating ring 13. They therefore pass each and every bearing unit 16 or 15 along their way during one rotation. The pressure sensors 39, 41 respectively the fluid pressure transducers are adapted to measure the fluid pressure of the fluid film present in the gap 43 between the adjacent surfaces of the rotating ring 13 and the bearing pads 15 respectively in the gap 44 between the adjacent surfaces of the rotating ring 13 and the bearing units 15. These surfaces are separated due to the pressure built up in the fluid film, and the loads carried by each bearing unit 15, 16 respectively its respective sliding pad 25 is directly related to the pressure magnitude. Due to the rotation of the pressure sensors 39, 41 along all axial bearing units 15, 16 the fluid film pressure can be mapped along the circumference for every bearing unit 15, 16 respectively for every sliding pad 25, with the controller 36 being adapted to determine the load resting on each bearing unit 15, 16 respectively sliding pad 25 based on the pressure values. Therefore, a single pressure sensor 39 can provide information regarding the load of all circumferentially distributed bearing units 16, while a single pressure sensor 41 can provide load information for all circumferentially distributed bearing units 15.

FIG. 7 shows an embodiment of the main bearing 11 comparable to FIG. 6, with the outer rotating ring 13 and the inner stationary ring 14, to which, although not shown in this cross section, the radial bearing units 17 are attached, with the sliding pads 25 of these radial bearing units 17 guiding the rotating ring 13 in the radial direction. Also, here a gap is given between the adjacent surfaces of the inner circumference of the rotating ring 13 and the adjacent sliding pads 25 of the radial bearing units 17. Again, also here a fluid film separates the rotating ring 13 from the sliding surface 26 due to the pressure built up in the fluid film in the gap, while the loads carried by the tilting sliding surfaces 26 are directly related to the pressure magnitude.

For measuring the fluid pressure as a measurement data regarding the real load resting on the radial bearing unit 17 respectively the radial pads 25, a pressure sensor 45 is arranged in a radial bore 46, which is open towards the radial bearing unit 17 respectively the radial sliding pads 25. Again, this pressure sensor 45 communicates with a controller 36, which is adapted to process the given load measurement data.

It is certainly possible and advantageous to measure load measurement data of all axial and radial bearing units 15, 16, 17, so that in an embodiment all three pressure sensors 39, 41 and 45 are provided at the rotating ring 13 together with the controller 36. In this embodiment all pressure sensors 39, 41 and 45 are part of the measurement arrangement 31 in form of the indirect measurement arrangement 38, together with the common controller 36.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A main bearing for a wind turbine, comprising a stationary ring and a rotating ring to be coupled to a rotor, wherein the main bearing is a fluid film bearing comprising several bearing units, wherein the several bearing units are at least one of radial, axial, and tapered bearing units, arranged at the stationary ring around the circumference on both sides of the rotating ring, for bearing the rotating ring, and further comprising a load measurement arrangement for determining measurement data which are a measure for the load applied to or resting on at least one of the several bearing units, wherein the measurement arrangement is a direct measurement arrangement for measuring the data directly at at least one of the several bearing units, wherein the direct measurement arrangement comprises at least one measurement device being directly attached to the at least one of the several bearing units, wherein the at least one measurement device is or comprises at least one strain gauge or at least one load cell, arranged at a support structure of the at least one of the several bearing units, wherein the at least one of the several bearing units or each bearing unit of the several bearing units comprises a bearing pad arranged at the support structure by which the respective bearing unit is mounted to the stationary ring, wherein the bearing pad is coupled to the support structure by a ball joint with a ball head provided at the bearing pad and a ball socket provided at the support structure, wherein the strain gauge or the load cell is mounted to a bottom side of the support structure adjacent to the ball socket, and wherein a recess is provided in the bottom side in which recess the at least one strain gauge or at least one load cell is arranged.

2. The main bearing according to claim 1, wherein the measurement arrangement is adapted to determine measurement data for at least one of the several bearing units.

3. The main bearing according to claim 1, further comprising an indirect measurement arrangement for measuring the data as indirect data remote of the at least one of the several bearing units.

4. The main bearing according to claim 3, wherein the indirect measurement arrangement comprises at least one measurement device attached to the rotating ring.

5. The main bearing according to claim 4, wherein the measurement device is or comprises at least one pressure sensor arranged and adapted for measuring the fluid pressure of a lubrication fluid present in a gap between the rotating ring and the bearing unit.

6. The main bearing according to claim 5, wherein the rotating ring is provided with a radial, axial, or tapered bore that opens towards an adjacent bearing unit arranged on an opposite side of the rotating ring, wherein the at least one pressure sensor is arranged in the radial, axial, or tapered bore.

7. The main bearing according to claim 6, wherein one or two bores are provided; wherein when two bores are provided, one bore is open to the radial bearing units and the other bore is open to the axial bearing units; wherein when one bore is provided the one bore is open to the tapered bearing unit; wherein the one bore and the other bore are arranged at one ring side, with a separate pressure sensor arranged in each bore.

8. The main bearing according to claim 7, wherein a third bore open to the other ring side with a third pressure sensor inside is provided.

9. The main bearing according to claim 1, wherein the measurement arrangement is adapted to determine measurement data for all of the several bearing units.

10. A method for condition monitoring and for controlling a wind turbine, comprising:

providing a main bearing, wherein the main bearing includes a stationary ring and a rotating ring to be coupled to a rotor, wherein the main bearing is a fluid film bearing comprising several bearing units, wherein the several bearing units are at least one of radial, axial, and tapered bearing units, arranged at the stationary ring around the circumference on both sides of the rotating ring, for bearing the rotating ring, providing a load measurement arrangement for determining measurement data which are a measure for the load applied to or resting on at least one of the several bearing units, and controlling the wind turbine based on the determined measurement data, wherein the load measurement arrangement is selected from:

a) a direct measurement arrangement for measuring the data directly at at least one of the several bearing units, wherein the direct measurement arrangement comprises at least one measurement device being directly attached to the at least one of the several bearing units, wherein the at least one measurement device is or comprises at least one strain gauge or at least one load cell, arranged at a support structure of the at least one of the several bearing units, wherein the at least one of the several bearing units or each bearing unit of the several bearing units comprises a bearing pad arranged at the support structure by which the respective bearing unit is mounted to the stationary ring, wherein the bearing pad is coupled to the support structure by a ball joint with a ball head provided at the bearing pad and a ball socket provided at the support structure, wherein the strain gauge or the load cell is mounted to a bottom side of the support structure adjacent to the ball socket, and wherein a recess is provided in the bottom side in which recess the at least one strain gauge or at least one load cell is arranged; and/or b) an indirect measurement arrangement for measuring the data as indirect data remote of the at least one of the several bearing units, wherein the indirect measurement arrangement comprises at least one measurement device attached to the rotating ring, wherein the measurement device is or comprises at least one pressure sensor arranged and adapted for measuring the fluid pressure of a lubrication fluid present in a gap between the rotating ring and the bearing unit, wherein the rotating ring is provided with a radial, axial, or tapered bore that opens towards an adjacent bearing unit arranged on an opposite side of the rotating ring, and wherein the at least one pressure sensor is arranged in the radial, axial, or tapered bore.

11. A main bearing for a wind turbine, comprising a stationary ring and a rotating ring to be coupled to a rotor, wherein the main bearing is a fluid film bearing comprising several bearing units, wherein the several bearing units are at least one of radial, axial, and tapered bearing units, arranged at the stationary ring around the circumference on both sides of the rotating ring, for bearing the rotating ring, and further comprising a load measurement arrangement for determining measurement data which are a measure for the load applied to or resting on at least one of the several bearing units, wherein the measurement arrangement is an indirect measurement arrangement for measuring the data as indirect data remote of the at least one of the several bearing units, wherein the indirect measurement arrangement comprises at least one measurement device attached to the rotating ring, wherein the measurement device is or comprises at least one pressure sensor arranged and adapted for measuring the fluid pressure of a lubrication fluid present in a gap between the rotating ring and the bearing unit, wherein the rotating ring is provided with a radial, axial, or tapered bore that opens towards an adjacent bearing unit arranged on an opposite side of the rotating ring, and wherein the at least one pressure sensor is arranged in the radial, axial, or tapered bore.

12. The main bearing according to claim 11, wherein one or two bores are provided; wherein when two bores are provided, one bore is open to the radial bearing units and the other bore is open to the axial bearing units; wherein when one bore is provided the one bore is open to the tapered bearing unit; wherein the one bore and the other bore are arranged at one ring side, with a separate pressure sensor arranged in each bore.

13. The main bearing according to claim 12, wherein a third bore open to the other ring side with a third pressure sensor inside is provided.

* * * * *